United States Patent [19]

Akimoto

[11] Patent Number: 4,951,499

[45] Date of Patent: Aug. 28, 1990

[54] INTAKE AIR CALCULATING SYSTEM FOR AUTOMOTIVE ENGINE

[75] Inventor: Akira Akimoto, Tokyo, Japan

[73] Assignee: Fuji Jukogyo Kabushiki Kaisha, Tokyo, Japan

[21] Appl. No.: 366,156

[22] Filed: Jun. 14, 1989

[30] Foreign Application Priority Data

| | | | |
|---|---|---|---|
| Jun. 24, 1988 | [JP] | Japan | 63-157686 |
| Jun. 27, 1988 | [JP] | Japan | 63-159760 |
| Jul. 13, 1988 | [JP] | Japan | 63-175944 |
| Jul. 20, 1988 | [JP] | Japan | 63-180848 |

[51] Int. Cl.[5] ............ G01M 19/00

[52] U.S. Cl. ............ 73/118.2

[58] Field of Search ............ 73/118.2

[56] References Cited

FOREIGN PATENT DOCUMENTS

| | | | |
|---|---|---|---|
| 0010415 | 1/1982 | Japan | 73/118.2 |
| 59-200032 | 11/1984 | Japan . | |
| 61-201857 | 9/1986 | Japan . | |
| 63-21351 | 1/1988 | Japan . | |

*Primary Examiner*—Robert Raevis
*Attorney, Agent, or Firm*—Martin A. Farber

[57] ABSTRACT

The quantity of intake air passing a throttle valve of an engine is calculated and a weight for a weighted mean is derived from a map in accordance with the throttle valve position and engine speed. The quantity of the intake air is calculated by multiplying the ratio of a weight at a last time to a weight at a present time by an intake air quantity produced at the last time to provide a product, by dividing a throttle passing air quantity produce by the throttle passing air calculator at the present time by a weight at the present time to provide a quotient, and by adding the product and the quotient.

4 Claims, 18 Drawing Sheets

INTAKE AIR CALCULATING SYSTEM FOR AUTOMOTIVE ENGINE

BACKGROUND OF THE INVENTION

The present invention relates to a system and a method for calculating the quantity of intake air for controlling an engine for a motor vehicle.

In a fuel injection control system having an injection pulse width calculator based on the quantity of intake air, the intake air quantity must be measured with precision. As an intake air quantity sensor, an airflow meter with a hot film type or with a hot wire is provided in an intake passage at a position upstream of a throttle valve of the engine to detect the quantity of intake air.

Since the sensor has a high response, the output of the sensor oscillates as shown by the dot-dash line of FIG. 7, because of the pulsation of the intake air induced in the cylinders of the engine. Heretofore, the output Qs is averaged to obtain an intake air quantity Qs'.

In the fuel injection control system, a basic fuel injection pulse width Tp is determined in accordance with the intake air quantity Qs' and engine speed N as follows.

$$Tp = K.Qs'/N \qquad \text{(K:constant)}$$

An actual fuel injection pulse width Ti is obtained by correcting the basic fuel injection pulse width Tp with various coefficients such as a coolant temperature coefficient, an acceleration coefficient, and a feedback correcting coefficient, so that the air-fuel mixture is prevented from becoming rich or lean.

In an ignition timing control system, the basic fuel injection pulse width Tp obtained based on the quantity Qs' is regarded as engine load. An ignition timing is derived from an ignition timing map in accordance with the basic injection pulse width Tp and the engine speed N. The ignition timing is corrected with various coefficients corresponding to the above coefficients to determine an actual ignition timing.

When the throttle valve is rapidly opened for accelerating the engine, the intake air quantity sensor detects the amount of intake air Qs including the intake air induced in the cylinders of the engine and the intake air induced in an air chamber downstream of the throttle valve and an intake manifold. In other words, all the air passing through the throttle valve is measured by the sensor. Accordingly, the air actually induced in the cylinders can not be measured at once. The actual quantity induced in the cylinders appears on the output of the sensor with a delay D as shown in FIG. 7.

In a multiple-point injection system, injectors are disposed in terminal portions of an intake manifold. Since the injection time is set before the intake stroke of an engine, the air fuel mixture immediately after rapid opening of the throttle valve becomes lean for a moment. Then the quantity of fuel injection is determined based on the increased amount of the intake air. Thus, the air-fuel ratio rapidly becomes rich. As a result, amounts of HC and CO in the exhaust gas increase to make the emission poorer. Further, the power of the engine is temporarily reduced to lower the driveability of the motor vehicle. Similarly, when the throttle valve is rapidly closed, the air-fuel ratio deviates to make the emission poorer. The ignition timing is not also properly controlled at transient states.

Japanese Patent Application Laid-Open No. 59-200032 discloses a system where the basic injection pulse width Tp is corrected with a value based on the quantity of fuel injection calculated at the last injection to obtain a weighted means value.

However, in this system, the calculation is made at a predetermined crank angle, namely a calculating cycle $\Delta t$ is determined in dependency on the engine speed N. Accordingly, the calculation cycle becomes long at a low speed range of the engine, so that the discrepancy of the fuel injection pulse width Ti with respect to the intake air quantity Qs becomes large.

If the calculating cycle $\Delta t$ is set to meet to a low engine speed operation, the interval of the injection time becomes extremely short at a high engine speed range, so that an injection valve can not be properly controlled.

Japanese Patent Application Laid-Open No. 61-201857 discloses a system in which a calculating cycle $\Delta t$ is determined in accordance with the engine speed. In the system, the actual intake air quantity actually induced in the cylinders is supposed to have a time lag of first order with respect to the time when the sensor detects the intake air quantity Qs. An estimated intake air quantity Q is calculated through the weighted means to synchronize the production of the quantity Q with the engine cycle. The intake air quantity Q(tn) at the present time is calculated by the following equation.

$$Q(tn) = (1-\alpha)Q(tn-1) + \alpha Qs \qquad (1)$$

where Q(tn−1) is the estimated intake air quantity at the last time, and $\alpha$ is the weight for the weighted mean. The weight $\alpha$ is obtained by the following equation.

$$\alpha = \frac{\Delta t}{\tau + \Delta t} = \frac{1}{\frac{\tau}{\Delta t} + 1} \qquad (2)$$

where $\Delta t$ is the calculating cycle, and $\tau$ is the time constant.

The time constant $\tau$ is obtained by the following equation.

$$\tau = \frac{VC}{a \times VH \times N \times R \times T} \qquad (3)$$

where a is a constant,

Vc is the capacity of an intake manifold,

VH is the total displacement of the engine,

N is the engine speed,

R is the gas constant, and

T is the absolute temperature.

However, it will be seen from the equations (2) and (3) that the weight $\alpha$ in the equation (1) is based on only the time constant $\tau$ dependent on the engine speed N. As shown in FIG. 8, in the range between t0 and t1 where the engine speed N does not rise (FIG. 8*a*) in accordance with the rapid opening of the throttle valve (FIG. 8*b*), the actual intake air quantity Q' increases with an increase of throttle valve opening degree $\theta$. However, when the engine speed begins to rise, the calculated intake air quantity Q is delayed with the first order time lag (FIG. 8*c*) with respect to the increase of intake air quantity Q. As a result, the intake air quantity Q deviates from the actual intake air quantity Q' by a difference shown by the hatching.

Consequently, when the engine speed N rapidly rises at racing or a vehicle is started in a first speed of a transmission, the air-fuel ratio becomes temporarily lean. When the engine speed is rapidly reduced for changing the transmission ratio by closing the throttle valve, the air-fuel ratio becomes rich.

The actual quantity Q' varies in accordance with the return flow of the intake air at the overlapping period of an intake valve opening period and an exhaust valve opening period and with the throttle valve opening degree $\theta$. However, the time constant $\tau$ does not compensate such a variation. Accordingly, the intake air quantity Q calculated based on the time constant $\tau$ can to deviate from a necessary quantity.

A microcomputer must take some time to calculate the weight $\alpha$ as a function of the time constant $\tau$. Consequently, the time necessary for calculating the intake air quantity Q and the injection pulse width Ti are shortened by the calculation times for the coefficient. Therefore, the engine can not be properly controlled. In order to overcome this defect, a microcomputer having a large capacity must be used, which increases the manufacturing cost.

SUMMARY OF THE INVENTION

An object of the present invention is to provide a system and a method for calculating an intake air quantity in which the intake air quantity corresponding to an actually induced intake air quantity can be accurately and quickly calculated without using a microcomputer having a large capacity at a low manufacturing cost.

Another object of the invention is to provide a system and a method where the air fuel mixture is prevented from becoming rich or lean during a transient state and an optimum ignition timing is determined.

A further object of the present invention is to provide a system and a method which improves the driveability of the motor vehicle, the efficiency of the engine and the exhaust emission.

The other objects and features of this invention will become understood from the following description with reference to the accompanying drawings.

DETAILED DESCRIPTION OF THE PREFERRED EMBODIMENTS

Figure 1:
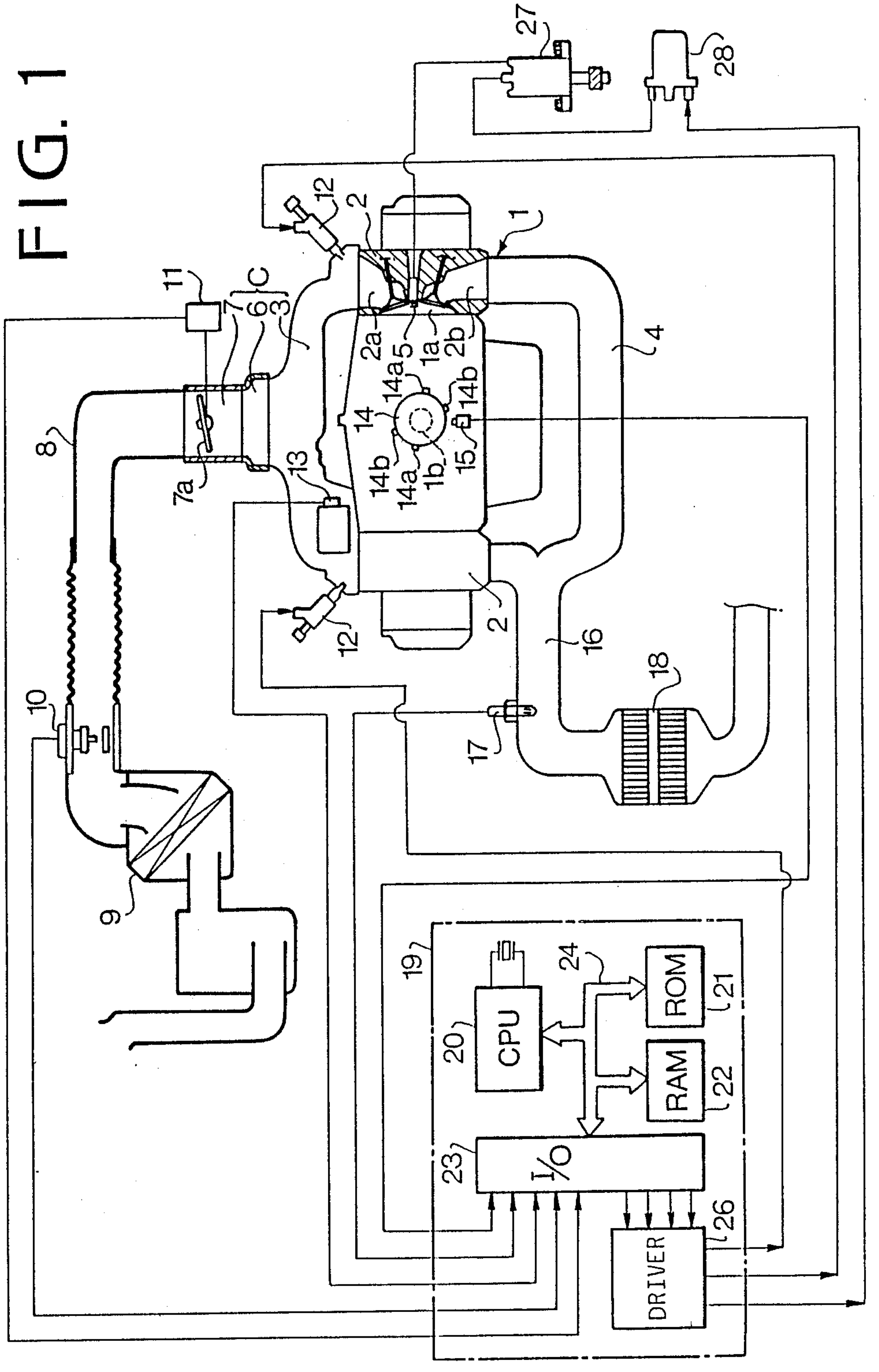
FIG. 1 is a schematic illustration of a system according to the present invention.

Referring to FIG. 1 showing a horizontal opposite type four-cylinder engine 1, a cylinder head 2 of the engine 1 has intake ports 2*a* and exhaust ports 2*b* which are communicated with an intake manifold 3 and an exhaust manifold 4, respectively. A spark plug 5 is located in each combustion chamber 1*a* formed in the cylinder head 2. A throttle chamber 7 having a throttle valve 7*a* is communicated with the intake manifold 3 through an air chamber 6. The throttle chamber 7 is communicated with an air cleaner 9 through an intake pipe 8. The throttle chamber 7 downstream of the throttle valve 7*a*, air chamber 6, intake manifold 3 and intake port 2*a* upstream of an intake valve define a chamber C for a cylinder.

An intake air quantity sensor 10 (hot wire type airflow meter) is provided in the intake pipe 8 downstream of the air cleaner 9. A throttle position sensor 11 is provided for detecting the opening degree of the throttle valve 7*a*. Fuel injectors 12 are provided in the intake manifold 3 adjacent every intake port 2*a*. A coolant temperature sensor 13 is provided in a coolant jacket (not shown) of the engine 1. A crankshaft disk 14 is secured to a crankshaft 1*b* of the engine 1. A crank angle sensor 15 (magnetic pickup) is provided adjacent the crankshaft disk 14.

Figure 4:
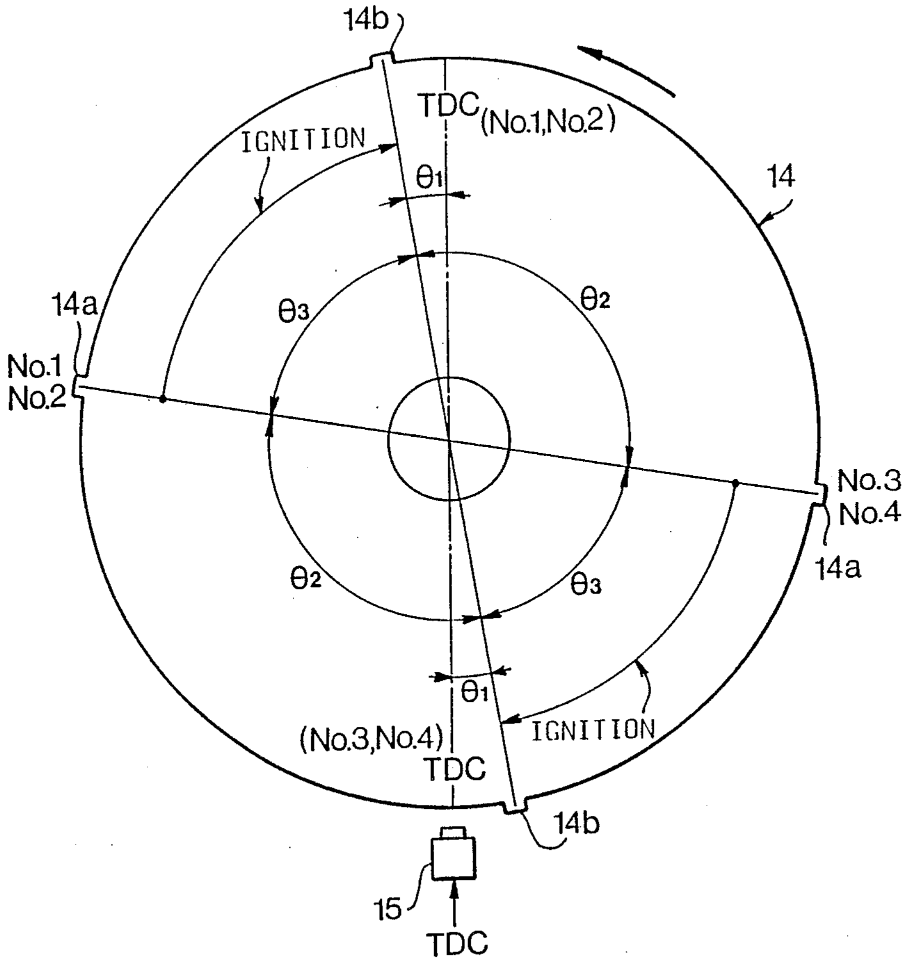
FIG. 4 shows a crankshaft disk provided in the system.

Referring to FIG. 4, the cylinders of the engine are divided into two groups. The first group consists of No. 1 and No.2 cylinders, and the second group consists of No.3 and No.4 cylinders, in each group, top dead centers for both cylinders at the same timing. The crankshaft disk 14 has a pair of projections 14*a* representing basic crank angle and a pair of projections 14*b* representing a basic point for calculating angular velocity. The projections 14*a* are diametrically opposite to each other and the projections 14*b* are also diametrically opposite to each other.

An angle $\theta_1$ of each of the projections 14*b* is, for example, 10° before the top dead center (BTDC). An angle $\theta_2$ between projections 14*b* and 14*a* is 110° and an angle $\theta_3$ between the projection 14*a* and the other projection 14*b* is 70°.

When the crankshaft disk 14 rotates, the crank angle sensor 15 detects the positions of the projections 14*a* and 14*b* and produces signals in the form of pulses.

Referring to FIG. 1, an $O_2$-sensor 17 and a catalytic converter 18 are provided in an exhaust passage 16 communicated with the exhaust manifold 4.

An electronic control unit 19 having a microcomputer comprises a CPU 20, a ROM 21, a RAM 22 and an input/output interface 23, which are connected to each other through a bus line 24.

An operating condition parameter detecting means 25 (FIG. 2) comprising sensors 10, 11, 13, 15 and 17 is connected to an input port of the input/output interface 23. An output port of the interface 23 is connected to a driver 26 which is connected to the injectors 12 and spark plug 5 of a corresponding cylinder through an ignition coil 28 and a distributor 27.

Control programs and fixed data such as a weight map and an ignition timing map are stored in the ROM 21. Output signals of the sensors are stored in the RAM 21. The CPU 20 calculates the fuel injection pulse width and the ignition timing in accordance with the control programs in the ROM 21 and based on various data in the RAM 22.

Figure 2A:
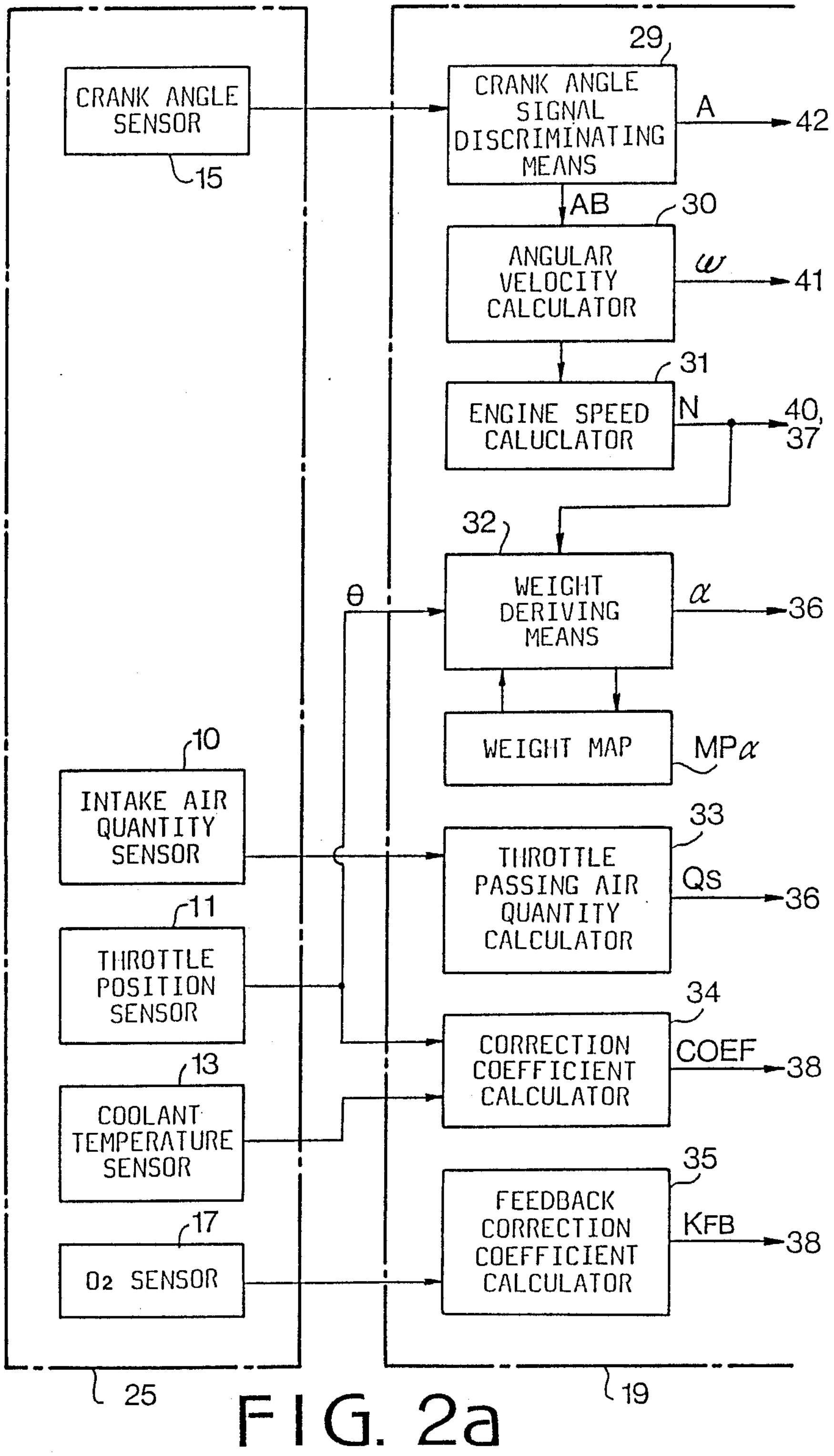
FIGS. 2*a* and 2*b* are a block diagram of an electronic control unit.
Figure 2B:
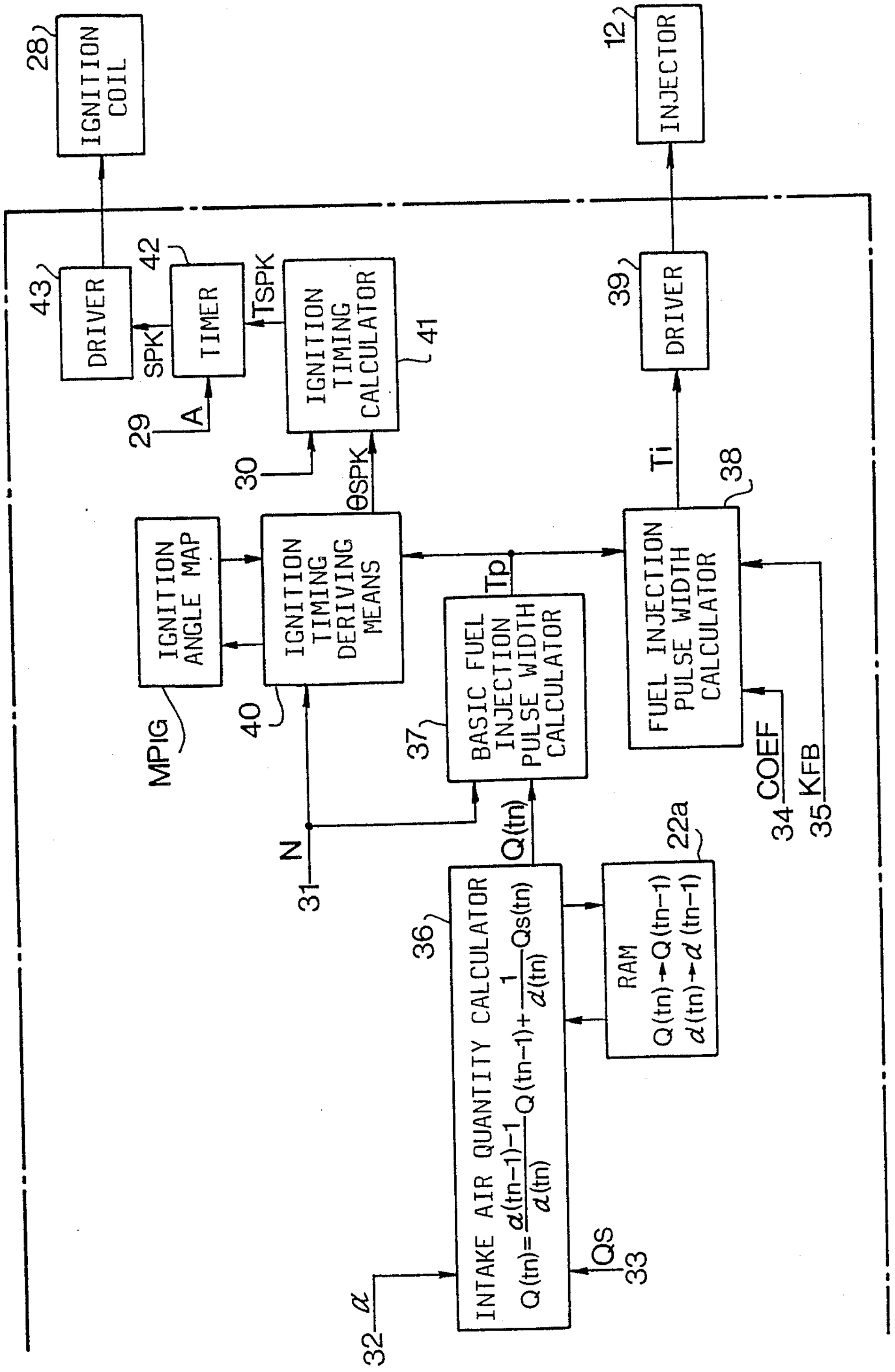

Referring to FIG. 2, the control unit 19 comprises a crank angle signal discriminating means 29 applied with a crank angle signal from the crank angle sensor 15. The crank angle signal discriminating means 29 discriminates a reference crank angle signal A dependent on the projection 14*a* from an angle signal B dependent on the projection 14*b*. Namely, on the basis of a first crank angle signal applied from the sensor 15, an interval T1 between the first crank angle signal and a second crank angle signal is measured. Then, on the basis of the second crank angle signal, an interval T2 between the second crank angle signal and a third crank angle signal generated after the second crank angle signal is measured. The interval T1 is compared with the interval T2. When $T_2 < T_1$, it is determined that the third crank angle signal produced after the second crank angle signal is the angle signal B. When $T_2 > T_1$, it is determined that the third crank angle signal is the reference crank angle signal A. When the reference crank angle signal A is discriminated, the crank angle signal discriminating means 29 produces a trigger signal which is applied to a timer 42. These signals A and B are applied to an angular velocity calculator 30 where the angular velocity $\omega$ of the crankshaft 1*b* is obtained from data of an angle $\theta 2$ stored in the ROM 21 in accordance with a time interval $T\theta$ from signal B to signal A.

The angular velocity $\omega$ is applied to an engine speed calculator 31 for calculating an engine speed N.

A throttle passing air quantity calculator 33 calculates an intake air quantity Qs passing through the throttle valve 7*a* and a bypass passage around the throttle valve 7*a* having an idle speed control valve (not shown) in accordance with an output signal from the intake air quantity sensor 10.

A correction coefficient calculator 34 calculates a correction coefficient COEF for the coolant temperature and acceleration of the engine is calculated in dependency on output signals from the coolant temperature sensor 13 and the throttle position sensor 11. A feedback correction coefficient calculator 35 is provided for calculating feedback correction coefficient $K_{FB}$ in dependency on an output voltage of the $O_2$-sensor 17.

A weight deriving means 32 is applied with the engine speed N from the engine speed calculator 31 and the throttle valve opening degree $\theta$ from the throttle position sensor 11 and derives a weight $\alpha$ from a weight map MP$\alpha$ stored in the ROM 21 in accordance with signals N and $\theta$ as parameters.

Since the weight $\alpha$ is obtained from the map, the calculation of the weight is not necessary, thereby reducing the time for obtaining the weight. Further, it is possible to store weights in the map, which includes a compensation coefficient for the variation of volumetric efficiency dependent on the back flow of the intake air and the variation of the throttle opening degree $\theta$ in a low engine speed range.

The weight $\alpha$ can be also obtained by the following calculation. The weight $\alpha$ is obtained by differentiating the time constant $\tau$ of a first order lag with a calculating period $\Delta t$.

$$\alpha = \tau/\Delta t.$$

The time constant $\tau$ of the first order lag is $$\tau = \frac{2 \times VC}{N \times \eta V \times VH} \quad (4)$$

where

N is the engine speed (rps),

Vc is the capacity of the chamber C ($m^3$), $\eta v$ is the volumetric efficiency between the chamber C and the combustion chamber with respect to the pressure ($kg/m^2$) and the temperature (°K.) in the chamber C, and VH is the displacement of the engine ($m^3$).

Thus, the weight $\alpha$ is rewritten as follows $$\alpha = \frac{2 \times Vc}{N \times \eta V \times VH \times \Delta t} \quad (4\text{-}1)$$

The capacity Vc and the displacement VH are constants in the engine. Further, the volumetric efficiency $\eta v$ is a constant, since it is varied little by load.

Thus if the time constant $\tau$ is $$\frac{2 \times Vc}{\eta V \times VH} = Kv = \text{const}$$

the time constant $\tau$ is represented as a function of the engine speed N as follows and a value of which is in inverse proportion to the engine speed N.

$$\tau = Kv/N \quad (5)$$

The calculating period $\Delta t$ is determined by the program and the capacity of the CPU 20 and is constant without influence of the engine speed N.

Accordingly, from equations (4) & (5), if $KV = KV'.t\Delta t$, $$\frac{2 \times Vc}{\eta V \times VH \times \Delta t} = KV' = \text{const}$$

Therefore, $$\alpha = KV'/N \quad (5\text{-}1)$$

An intake air quantity calculator 36 calculates the quantity Q (kg/sec) of the intake air in accordance with the weight $\alpha$ and the intake air quantity Qs applied from the throttle passing air quantity calculator 33 as below.

Figure 6:
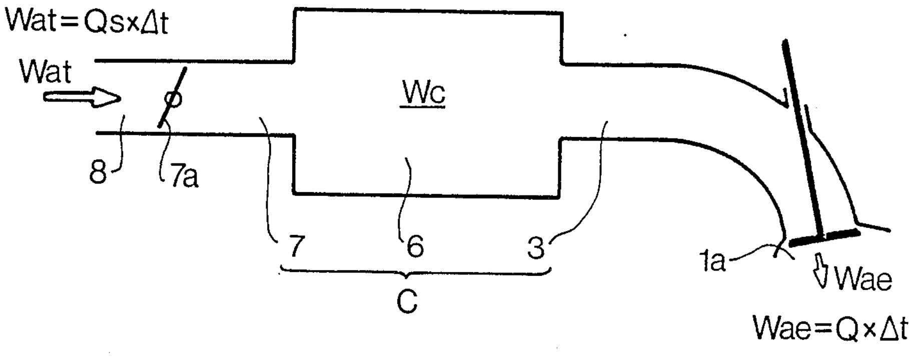
FIG. 6 is a schematic diagram showing an intake system.

Referring to FIG. 6, assuming that a detecting time of the intake air quantity Qs detected by the intake air quantity sensor 10 coincides with a time when the air passes through the throttle valve 7*a* and the bypass passage, the mass Wat (kg) of the intake air which enters the chamber C at calculating period $\Delta t$ is $$Wat = Qs \times \Delta t \quad (6)$$

The mass Wae (kg) of the intake air induced in combustion chambers 1*a* from the chamber C at the calculating period is $$Wae = Q \times \Delta t \quad (7)$$

On the other hand, the intake air quantity Q can be also obtained in accordance with a volume flow Vae ($m^3$/sec) per unit time entering the chamber C and a specific gravity $\epsilon$ of air in the chamber C as follows.

$$Q = Vae \times \epsilon \tag{8}$$

The volume flow Vae is $$Vae = \frac{N \times \eta V \times VH}{2} \tag{9}$$

where N/2 is the number of times of the intake strokes per one second of the four-cycle engine.

The specific gravity $\epsilon$ of air is obtained by the equation of state as follows.

$$\epsilon = \frac{PC}{RC \times TC} \tag{10}$$

where

Rc is the gas constant (kgm/kg°K.) of the air,

Tc is the temperature of the air in the chamber C (°K.), and

Pc is the pressure in the chamber C (kg/$m^2$).

Therefore, the equation (8) is $$Q = \frac{N \times \eta V \times VH}{2} \times \frac{PC}{RC \times TC} \tag{11}$$

The specific gravity is represented as a proportion of mass WC(kg) of the air in the chamber C to the capacity Vc ($m^3$) of the chamber C. Thus, the equation (11) is changed to $$Q = \frac{N \times \eta V \times VH}{2} \times \frac{WC}{VC} \tag{12}$$

The mass WC(tn) of the air in the chamber C at a time (tn) is obtained by substracting the mass Wae of the intake air induced in the combustion chamber 1*a* from the sum of the mass WC(tn−1) of the air at the last time (tn−1) and the mass Wat(tn) of the intake air newly induced in the chamber C at the present time (tn).

The time when the intake air is induced in the combustion chamber 1*a* is either the last time (tn−1) or the present time (tn). Assuming it to be the last time, the input and output relation of the mass of the intake air in the chamber C is expressed by the difference equation as follows.

$$\begin{aligned} WC(tn) &= WC(tn-1) + Wat(tn) - Wae(tn-1) \\ &= WC(tn-1) + Qs(tn) \times \Delta t - Q(tn-1) \times \Delta t \end{aligned} \tag{13}$$

In case of the mass Wae(tn) of the intake air at the present time, the mass WC(tn) of the air is $$\begin{aligned} WC(tn) &= WC(tn-1) + Wat(tn) - Wae(tn) \\ &= WC(tn-1) + Qs(tn) \times \Delta t - Q(tn) \times \Delta t \end{aligned} \tag{13'}$$

If the equation (4) representing the time constant is substituted for the equatiOn (12)

$$WC = Q \times \tau$$

Thus, the mass WC(tn) of the air in the chamber C at the present time is $$WC(tn) = Q(tn) \times \tau(tn) \tag{14}$$

and the mass WC(tn−1) of the air at the last time is $$WC(tn-1) = Q(tn-1) \times \tau(tn-1) \tag{15}$$

Substituting the equations (14) and (15) for the equation (13), the intake air quantity Q(tn) at the present time is $$Q(tn) = \frac{\frac{\tau(tn-1)}{\Delta t} - 1}{\frac{\tau(tn)}{\Delta t}} Q(tn-1) + \frac{1}{\frac{\tau(tn)}{\Delta t}} Qs(tn)$$

Since $\alpha = \tau/\Delta t$, the above equation is expressed as follows.

$$Q(tn) = \frac{\alpha(tn-1) - 1}{\alpha(tn)} Q(tn-1) + \frac{1}{\alpha(tn)} Qs(tn) \tag{16}$$

Substituting the equations (14) and (15) for the equation (13'), the intake air quantity Q(tn) at the present time is expressed as follows.

$$\begin{aligned} Q(tn) &= \frac{\frac{\tau(tn-1)}{\Delta t}}{\frac{\tau(tn)}{\Delta t} + 1} Q(tn-1) + \frac{1}{\frac{\tau(tn)}{\Delta t} + 1} Qs(tn) \\ &= \frac{\alpha(tn-1)}{\alpha(tn) + 1} Q(tn-1) + \frac{1}{\alpha(tn) + 1} Qs(tn) \end{aligned} \tag{16'}$$

In the equations (16) and (16'), $\alpha$(tn−1) and $\alpha$(tn) are the weights at the last time and the present time from the weight deriving means 32. The intake air quantity Q(tn) is obtained through the weighted means with the weights at the last time and the present time.

In the intake air quantity calculator 36, the intake air quantity Q(tn) is calculated in accordance with the equation (16).

The sum of the weights $$\frac{\alpha(tn-1) - 1}{\alpha(tn)} \text{ and } \frac{1}{\alpha(tn)}$$

in the equation (16) is $\alpha$(tn−1)/$\alpha$(tn).

On the other hand, the time constant $\tau$ and the engine speed N in the equation (5) are in inverse proportion to each other. Therefore, the sum of the weights at the acceleration of the engine is $$\alpha(tn-1)/\alpha(tn) > 1$$

The sum of the weights at the deceleration is $$\alpha(tn-1)/\alpha(tn) < 1$$

Namely, the weight ratio (correction value) varies with the engine speed. Accordingly, the value of the calculated intake air quantity Q(tn) changes in accordance with the variation of the engine speed, so that the intake air quantity Q(tn) can be accurately calculated even if the operation of the engine is in a transient state.

In the equation (16'), the sum of the weights is $$\frac{\alpha(tn-1)+1}{\alpha(tn)+1}$$

The equation becomes $\alpha(tn-1)/\alpha(tn)$ if 1 is omitted. Accordingly, the weight ratio varies with the variation of the engine speed.

Figure 7:
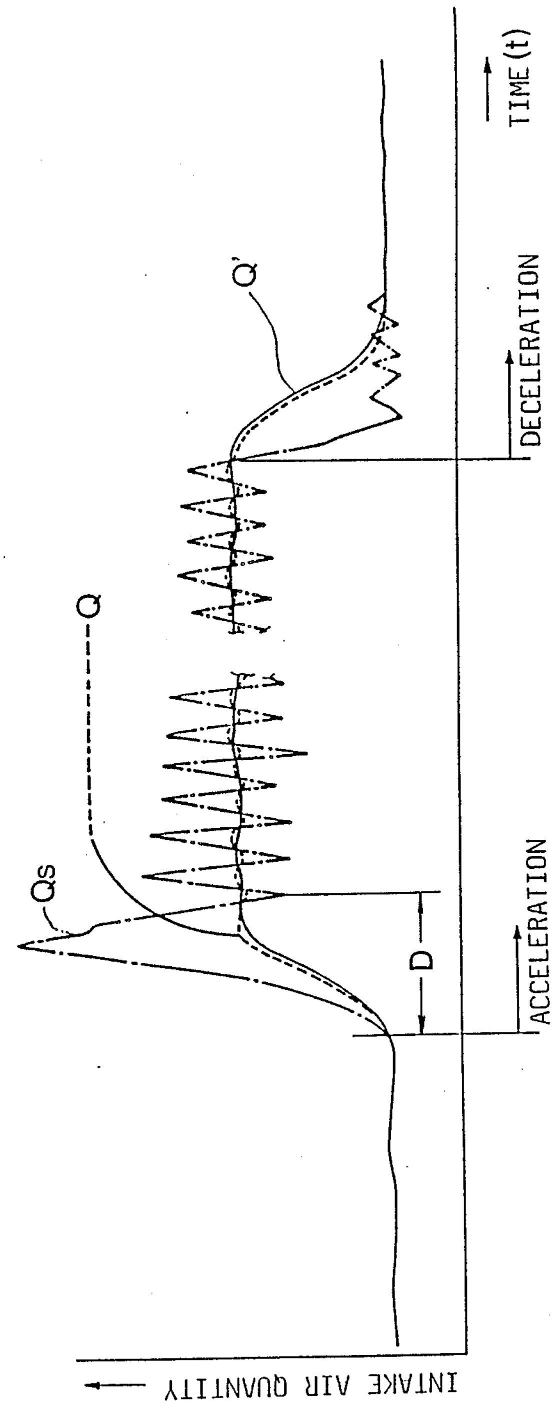
FIG. 7 is a graph showing variations of intake air quantity.
Figure 8A:
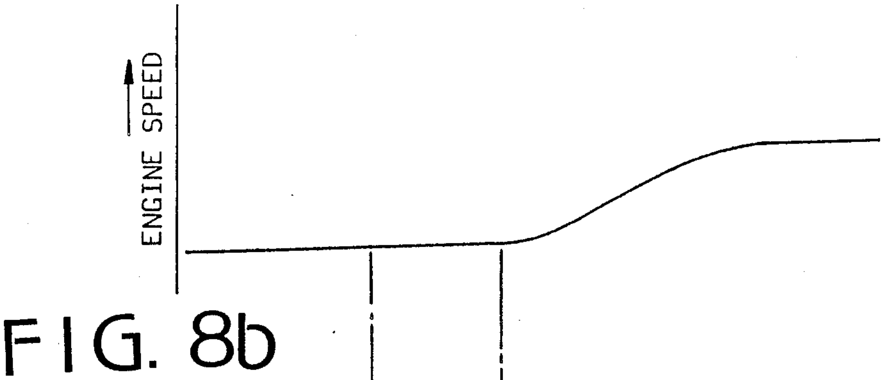
FIGS. 8*a* to 8*c* are graphs showing variations of engine speed and intake air quantity dependent on throttle valve opening degree.
Figure 8B:
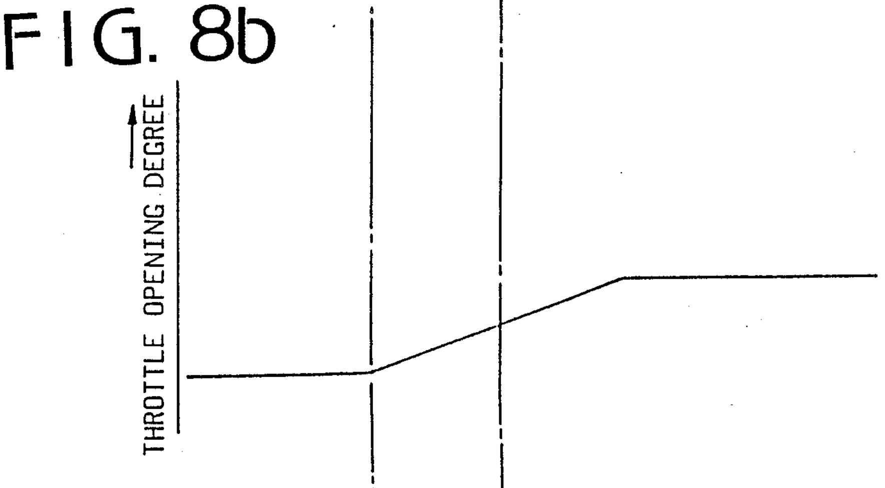
Figure 8C:
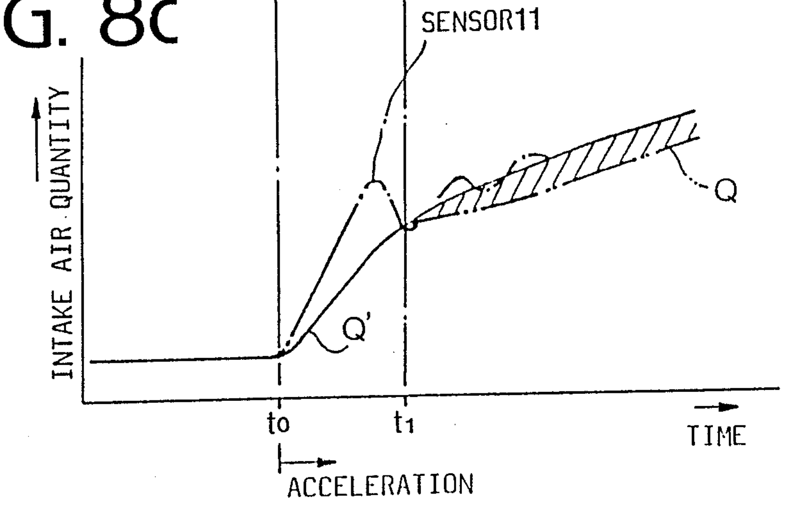

FIG. 7 shows results of experiments conducted by the applicant. It will be seen that the calculated intake air quantity Q is substantially equal to the actually induced intake air quantity Q', which is obtained from the experiments by using a model in a wide operation range of the engine including a low speed range.

The correction value varies with the engine speed so that the air fuel ratio is prevented from becoming lean at racing. Further, even if the engine speed N varies because of the hunting of the system and even if the actual intake air quantity varies, the air-fuel ratio does not vary. The fuel injection can also be properly controlled to provide optimum ignition timing.

The intake air quantity Q(tn) produced at the calculator 36 and the weight $\alpha(tn)$ obtained at the weight deriving means 32 are stored in predetermined addresses of the RAM 22.

A basic fuel injection pulse width calculator 37 calculates basic fuel injection pulse width Tp in accordance with the intake air quantity Q(tn) from the calculator 36 and the engine speed N(tn) from the calculator 31. The basic fuel injection pulse width Tp is calculated as follows.

$$Tp=K\times Q(tn)/N(tn) \qquad \text{(K:constant)}$$

The basic injection pulse width Tp from the calculator 37 and coefficients COEF from calculator 34 and $K_{FB}$ from calculator 35 are applied to an injection pulse width calculator 38 where an output injection pulse width Ti is calculated by the following equation.

$$Ti=Tp\times COEF\times K_{FB}$$

The pulse width Ti is applied to the injectors 12 through a driver 39. The basic fuel injection pulse width Tp and the engine speed N are applied to an ignition timing deriving means 40. In the means 40, a corresponding operation range stored in an ignition angle map $MP_{IG}$ is selected in accordance with these signals Tp and N, and an ignition angle $\theta_{SPK}$ is derived from the selected operation range. The ignition angle $\theta_{SPK}$ is applied to an ignition timing calculator 41 which is also applied with the angular velocity $\omega$ from the calculator 30. An ignition timing $T_{SPK}$ is calculated as follows.

$$T_{SPK}=\theta_{SPK}/\omega$$

The ignition timing $T_{SPK}$ is set in the timer 42 which starts measuring time in accordance with the angle signal A representing 70° BTDC. When the timer reaches a set ignition timin $T_{SPK}$, a spark signal SPK is applied to the ignition coil 29 through a driver 43.

Since the ignition timing $T_{SPK}$ is determined in accordance with the basic fuel injection pulse width Tp as a load parameter which is obtained from the intake air quantity Q(tn), an optimum ignition timing is quickly determined at transient state of the engine as well as steady state of the engine.

Figure 3:
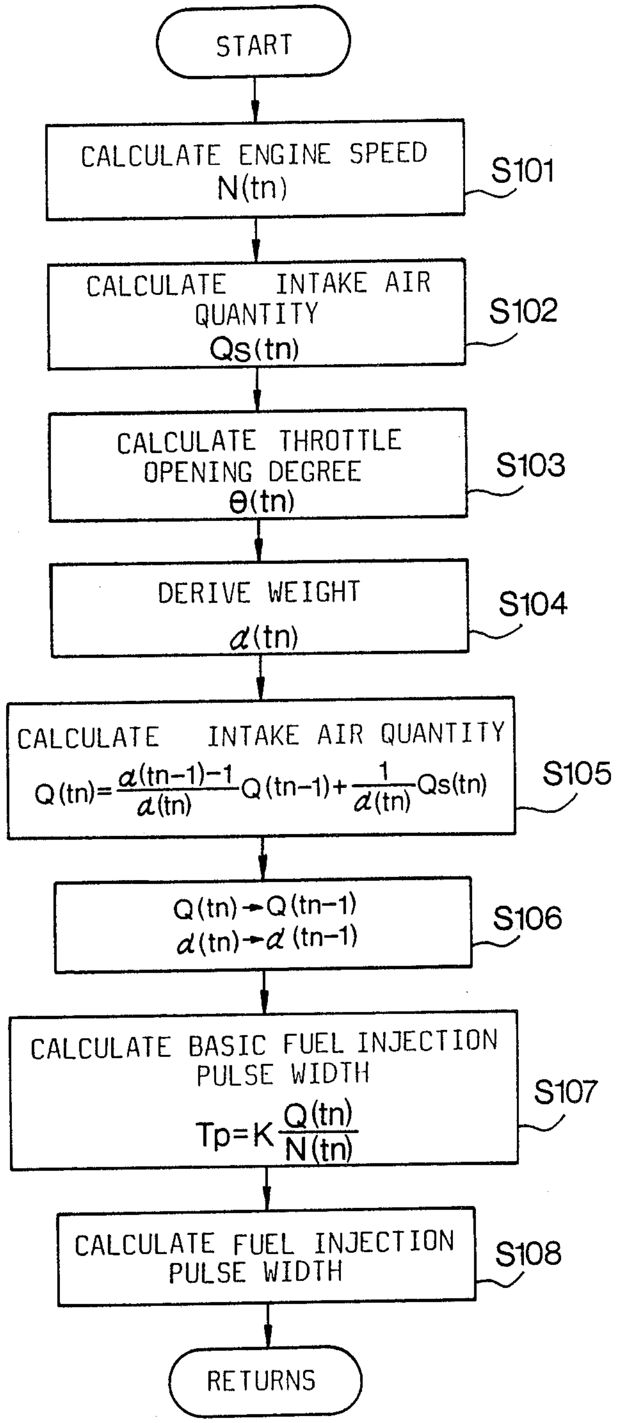
FIG. 3 is a flowchart showing a calculation routine for the fuel injection control of the system.

The operation for controlling the fuel injection of the system is described hereinafter with reference to the flowchart shown in FIG. 3.

At steps S101, S102 and S103, the engine speed N(tn), the intake air quantity Qs(tn), and the throttle opening degree $\theta$ at the present time are obtained from the output signals from the crank angle sensor 15, the intake air quantity sensor 10 and the throttle position sensor 11, respectively.

At a step S104, a weight $\alpha(tn)$ is derived from the weight $Mp\alpha$ in accordance with the engine speed N(tn) and the throttle opening degree $\theta Th(tn)$. At a step S105, the intake air quantity Q(tn) is obtained by calculating the equation (16) or (16').

At step S104, if the program is undergoing a first time, data of the last time do not exist. Accordingly, the program jumps to a step S106, where data of the intake air quantity Qs and the weight $\alpha(tn)$ obtained at steps S102 and 104 are stored in the RAM 22 as data at the last time, and then the program gets out of the routine.

After the first time, the program goes to step S106 from step S105, where the intake air quantity Q(tn) and the weight $\alpha(tn)$ are stored in the RAM 22 as data at the last time.

At a step S107, the basic fuel injection pulse width Tp is calculated in accordance with the engine speed N (tn) and the intake air quantity Q(tn) ($Tp=K\times Q(tn)/N(tn)$).

In order to for the intake air quantity Q(tn) to converge to the actually induced intake air quantity after the starting of the engine, the operation of the equation (16) must be repeated predetermined times although it is a very short period. Accordingly, during the period, the basic fuel injection pulse width Tp is calculated based on a simple mean value of intake air quantities Qs in place of the intake air quantity Q(tn). At a step S108, the basic injection pulse width Tp is corrected with a correction coefficient COEF and a feedback correction coefficient $K_{FB}$ to produce a fuel injection pulse width Ti ($Ti=Tp\times COEF\times K_{FB}$). In accordance with the pulse width Ti, the injectors 12 are driven.

Figure 5:
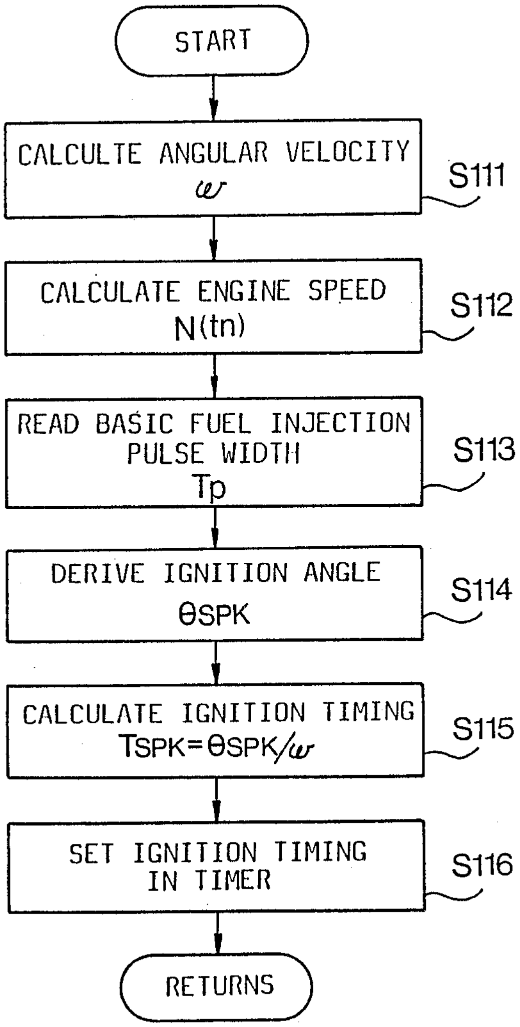
FIG. 5 is a flowchart showing a calculation routine for the ignition timing control of the system.

Explaining the controlling of the ignition timing with reference to a flowchart of FIG. 5, at steps S111 and S112, the angular velocity $\omega$ at the present time and the engine speed N(tn) based on the angular velocity $\omega$ are calculated in accordance with the output signal from the crank angle sensor 15, respectively.

At a step S113, the basic fuel injection pulse width Tp is read. At a step 114, the ignition angle $\theta_{SPK}$ is derived from the ignition angle map $MP_{IG}$ in accordance with signals N and Tp. At at step S115, the ignition timing $T_{SPK}$ with respect to the signal A is calculated from the angular velocity $\omega$ and the ignition angle $\theta spk$ ($T_{SPK}=\theta_{SPK}/\omega$). At a step S116, the ignition timing $T_{SPK}$ is set in the timer 42 which starts measuring time with respect to the signal A. When the timer reaches set ignition timing $T_{SPK}$, the spark signal $_{SPK}$ is applied to the ignition coil 12 to cut off the circuit for the primary winding of the coil 28. The spark plug 5 of the corresponding cylinder is sparked through the distributor 27.

Figure 9:
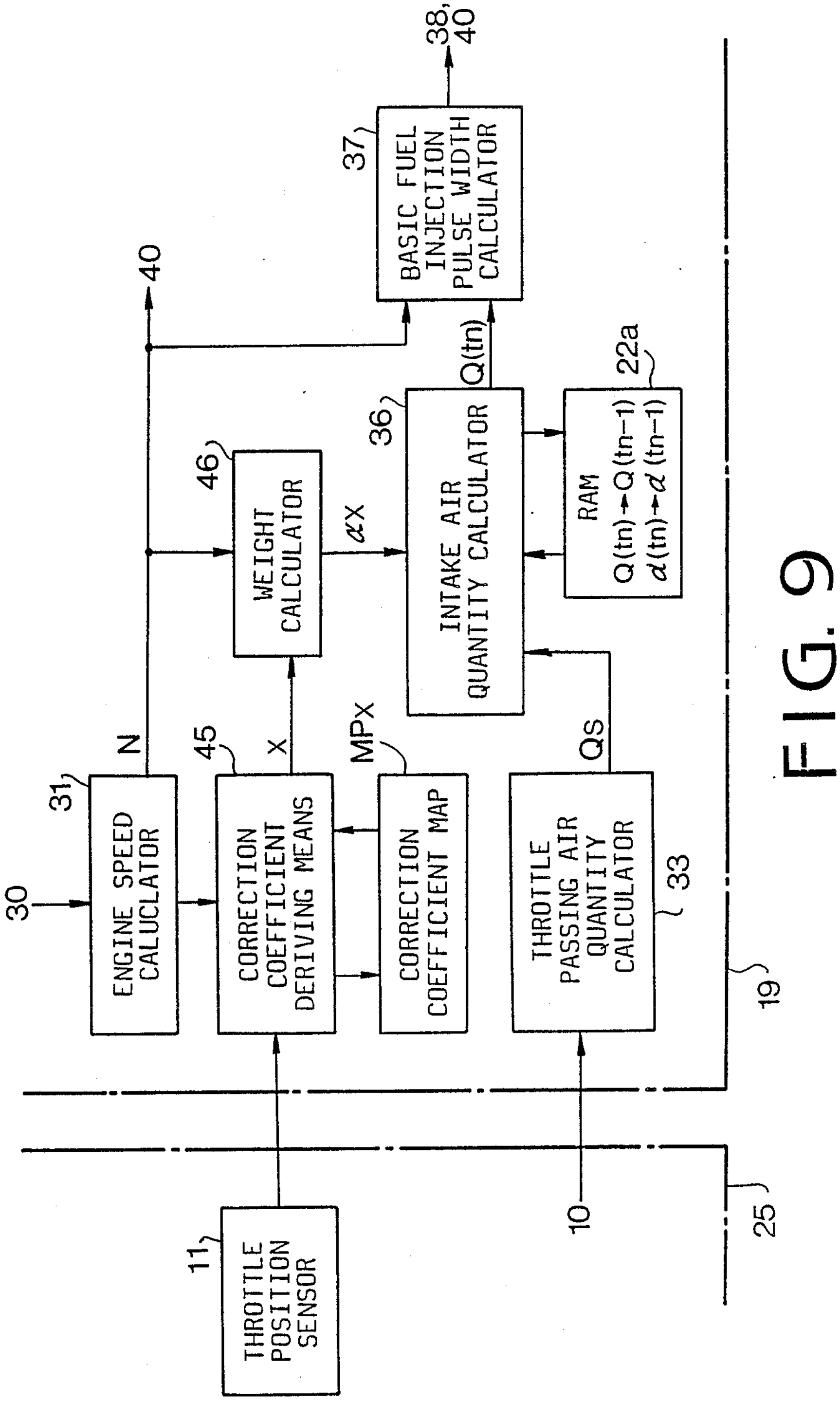
FIG. 9 is a block diagram showing a main part of a system of a second embodiment of the present invention.

FIG. 9 shows a main part of the system of the second embodiment. In the first embodiment, the volumetric efficiency $\eta v$ in the equation (4) is regarded as the constant. However, the volumetric efficiency reduces ($\eta v<1$) because of the back flow of the intake air in a low engine speed range at light load. Accordingly, it is necessary to correct the weight $\alpha$ of the equation (4-1) in accordance with various engine operating conditions.

In the system of the second embodiment, a correction coefficient deriving means 45, a correction coefficient table MPX, and an weight calculator 46 are provided as shown in FIG. 9. Correction coefficients $\chi$ are obtained by experiments on the throttle opening degree $\theta$TH and engine speed N and stored in the map MPX. The correction coefficient deriving means 45 derives a correction coefficient $\chi$ from the map MPX in accordance with the engine speed N and throttle opening degree $\theta$TH. The weight calculator 46 calculates the weight $\alpha$ as described above and corrects the weight $\alpha$ with the correcting coefficient $\chi$ to produce a corrected weight $\alpha\chi$. The intake air quantity calculator 36 calculates intake air quantity Q(tn) based on the corrected weight $\alpha\chi$ and throttle valve passing air quantity $Q_S$ as described hereinbefore. The intake air quantity Q(tn) and engine speed N are applied to a basic fuel injection pulse width calculator 37 for the calculation of the fuel injection pulse width. Other items and operations are the same as in the first embodiment.

In the second embodiment, the above described equations (9), (11) and (12) may be corrected with the correction coefficient as follows.

$$Vae = N \times \eta V \times VH \times x/2 \qquad (9')$$

$$Q = \frac{N \times \eta V \times VH \times x}{2} \times \frac{Pc}{Rc \times Tc} \qquad (11')$$

$$Q = \frac{N \times \eta V \times VH \times x}{2} \times \frac{WC}{VC} \qquad (12')$$

If the weight $(\alpha(tn-1)-1)/\alpha(tn)$ and the weight $1/\alpha(tn)$ are regarded as an intake air quantity coefficient $\alpha_1$ and a throttle passing air quantity coefficient $\alpha_2$, both weights are expressed as follows.

$$(\alpha(tn-1)-1)/\alpha(tn) = \gamma_1$$

$$1/\alpha(tn) = \gamma_2$$

The intake air quantity Q(tn) in the equation (16) is expressed as follows.

$$Q(tn) = \gamma_1 \times Q(tn-1) + \gamma_2 \times Q_S(tn) \qquad (17)$$

From the equation (5 - 1), it will be understood that the coefficients $\gamma_1$ and $\gamma_2$ can be represented as functions dependent only on engine speed N.

Figure 10:
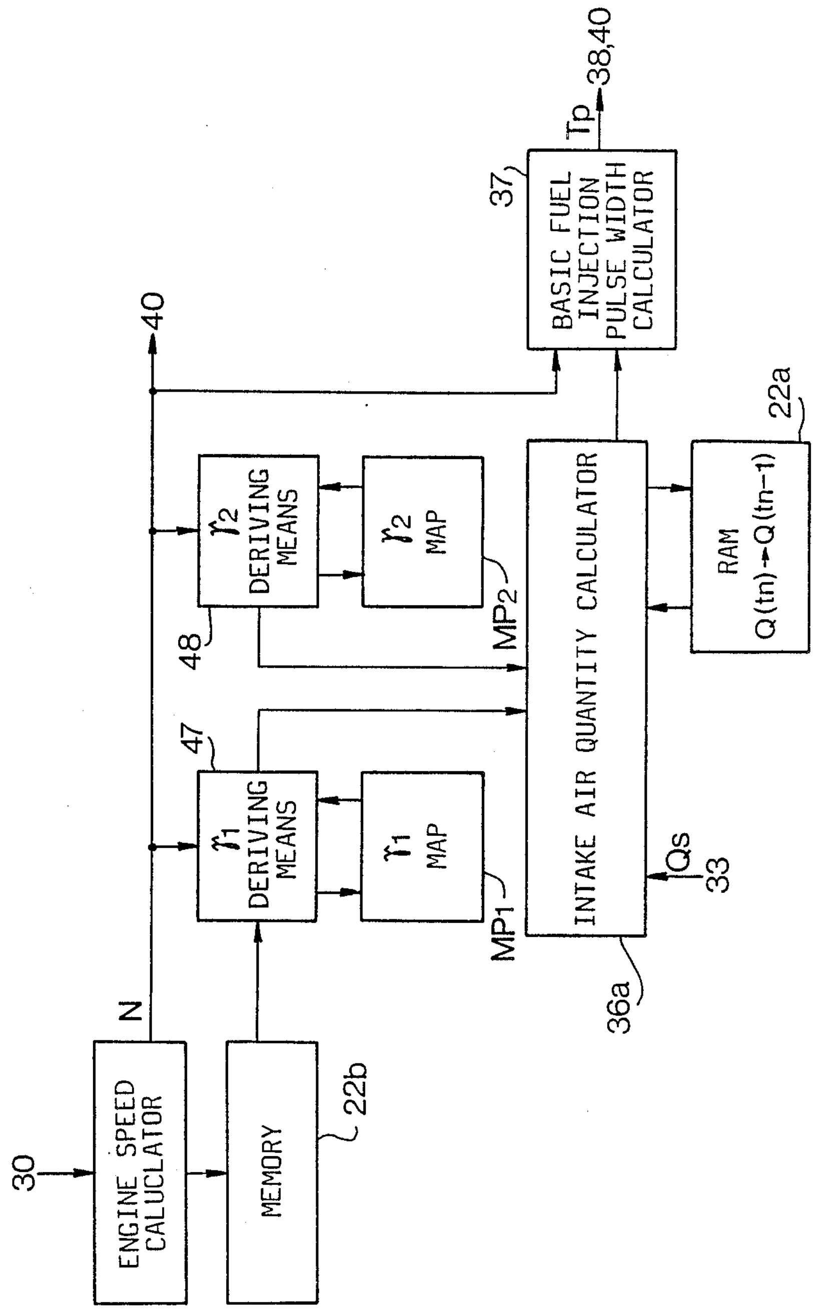
FIG. 10 is a block diagram of a main part of a third embodiment of the present invention.
Figure 11:
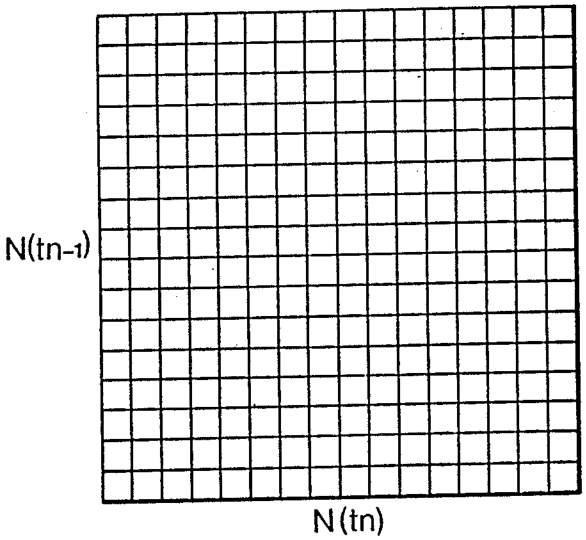
FIGS. 11 and 12 show coefficient maps.
Figure 12:
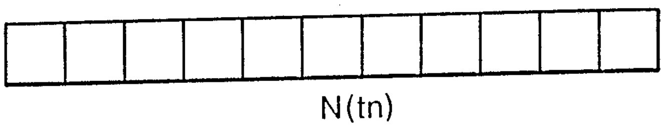

In the third embodiment shown in FIG. 10, a$\gamma_1$ map $MP_1$, and a $\gamma_2$ map $MP_2$ are provided, in which the coefficients $\gamma_1$ and $\gamma_2$ obtained by experiments are stored. FIG. 11 shows the $\gamma_1$ map $MP_1$ in which the intake air quantity coefficients $\gamma_1$ are stored in an address in accordance with the present time engine speed N(tn) and the last time engine speed N(tn−1). FIG. 12 shows the $\gamma_2$ map $MP_2$ in which throttle passing air quantity coefficients $\gamma_2$ are stored in accordance with the present time engine speed N(tn).

The system is provided with an engine speed memory **22*b* in the RAM 22 for storing the last time engine speed N(tn−1), and $\gamma_1$ and $\gamma_2$ deriving means 47 and 48**.

The $\gamma_1$ deriving means 47 derives an intake air quantity coefficient $\gamma_1$ from the $\gamma_1$ map $MP_1$ in accordance with the present time engine speed N(tn) from the engine speed sensor 31 and the last time engine speed N(tn−1) from the memory **22*b*. The $\gamma_2$ deriving means 48 derives a throttle passing air quantity coefficient $\gamma_2$ from the $\gamma_2$ map in accordance with the present time engine speed N(tn). The coefficients $\gamma_1$ and $\gamma_2$ are applied to an intake air quantity calculator 36*a*** which calculates intake air quantity Q(tn) in accordance with the equation (17). Other operations of the system are the same as the first embodiment.

In the system of the third embodiment, the weights in the first embodiment are provided as coefficients stored in a memory. Consequently, the calculation of the equation (17) can be more quickly made compared with the equation (16).

In the first embodiment, the intake air quantity Q(tn) dependent on the equation (16) is calculated based on the intake air quantity Q(tn−1) at the last time and the measured quantity Qs(tn) at the present time. However, there is a case where the calculated intake air quantity Q(tn) deviates from a required air quantity which the engine requires, particularly at transient states of the engine such as rapid acceleration. This is caused by a difference of the air quantity dependent on the time difference TSFT between the calculation time and the actual induction time in a cylinder.

Japanese Patent Laid Open No. 63-21351 discloses a system which forecasts the actually induced air quantity. However, the calculation of the intake air quantity in the system also is delayed at transient states.

Figure 13:
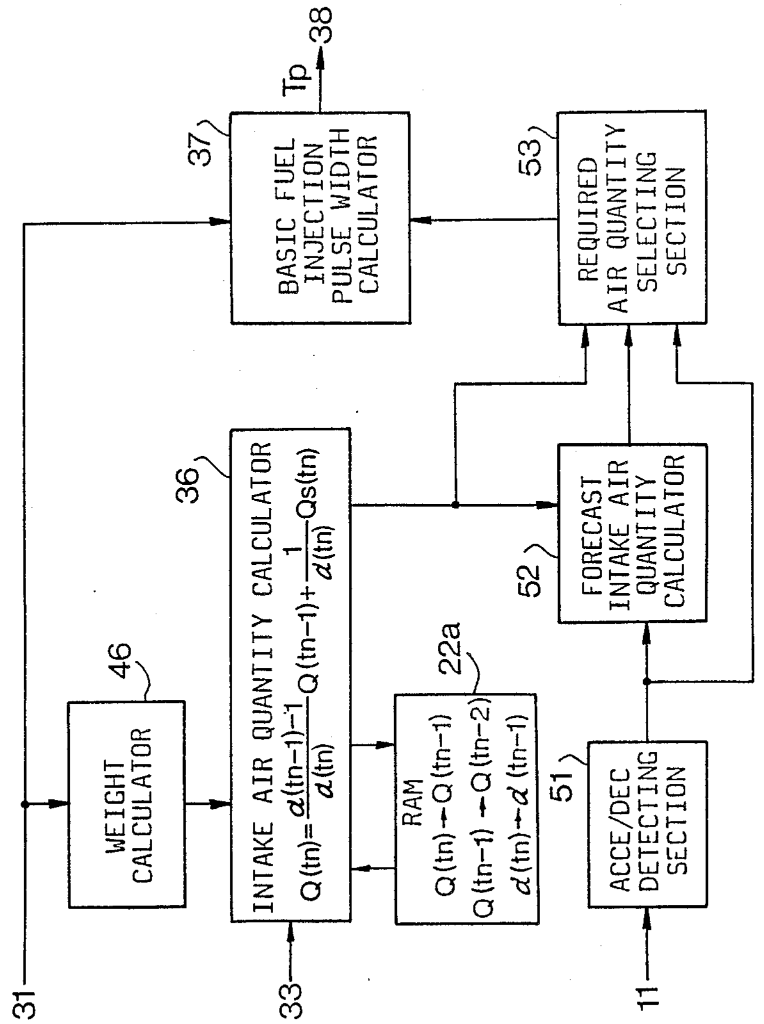
FIG. 13 is a block diagram of a main part of a fourth embodiment of the present invention.

The fourth embodiment is to solve the problems described above. FIG. 13 shows a main part of the system of the fourth embodiment. The system is provided with an acceleration/deceleration detecting section 51, a forecast air quantity calculator 52, and a required air quantity selecting section 53. The acceleration/deceleration detecting section 51 detects acceleration or deceleration based on the changing rate $\Delta\theta$Th of the throttle opening degree $\theta$Th per unit time to produce a transient signal which is applied to the forecast air quantity calculator 52 and the required air quantity selecting section 53.

The forecast air quantity calculator 52 performes a calculation of a forecast air quantity Qreq based on the intake air quantity Q from the intake air quantity calculator 36 as follows.

If the variation rate of the intake air quantity Q is V and the variation acceleration of the quantity Q is Ac, the forecast intake air quantity QSFT after the time TSFT from the present calculation of the quantity Q (tn) is $$QSFT = Q(tn) + V \times TSFT + \frac{a}{2} \times (TSFT)^2 \qquad (18)$$

The variation rate V and the variation acceleration Ac are expressed as follows $$V = \frac{Q(tn) - Q(tn-1)}{\Delta t} \qquad (19)$$

$$a = \frac{\frac{Q(tn) - Q(tn-1)}{\Delta t} - \frac{Q(tn-1) - Q(tn-2)}{\Delta t}}{\Delta t} = \frac{Q(tn) - 2 \times Q(tn-1) - Q(tn-2)}{(\Delta t)^2} \qquad (20)$$

From the equations (19) and (20), the equation (18) becomes $$QSFT = Q(tn) + \frac{Q(tn) - Q(tn-1)}{\Delta t} \times TSFT + \frac{Q(tn) - 2 \times Q(tn-1) + Q(tn-2)}{2 \times (\Delta t)^2} \times (TSFT)^2 \quad (21)$$

The time TSFT is $$TSFT = \frac{SFTDEG}{360} \times \frac{1}{N(tn)} \quad (22)$$

or $$TSFT = Ti(tn-1) + \frac{SFTDEG}{360} \times \frac{1}{N(tn)} \quad (23)$$

where

SFTDEG is a predetermined crank angle, and

Ti(tn−1) is the injection pulse width (sec) at the last time.

The crank angle SFTDEG in the equation (22) is, for example, 180 degrees. The crank angel SFTDEG in the equation (23) is

SFTDEG=90+ENDDEG where ENDDEG is a crank angle from an overlap top to an end of the fuel injection.

The required air quantity selecting section 53 selects the forecast intake air quantity QSFT from the calculator 52 as a required air quantity Qreq when the detection signal is applied from the acceleration/deceleration detecting section 51. When the detection signal is not applied, the section 53 selects the intake air quantity Q(tn) from the intake air quantity calculator 36 as a required air quantity Qreg. The required air quantity Qreq is fed to the basic fuel injection pulse width calculator 37.

Figure 14A:
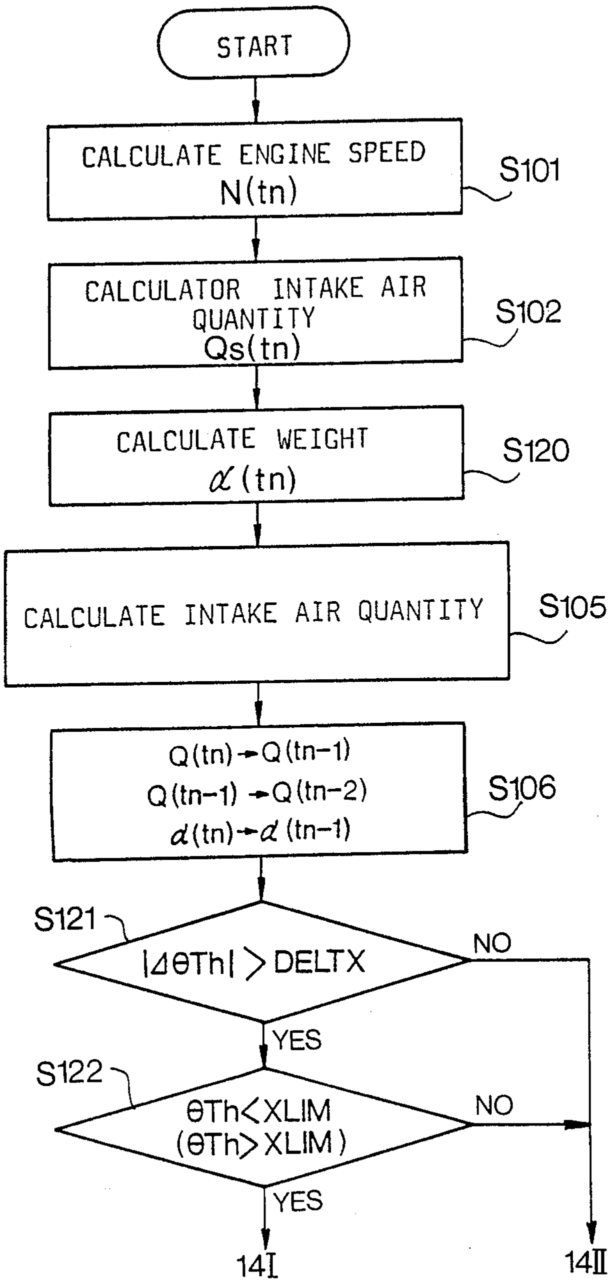
FIGS. 14*a* and 14*b* are flowcharts of the operation of the fourth embodiment.
Figure 14B:
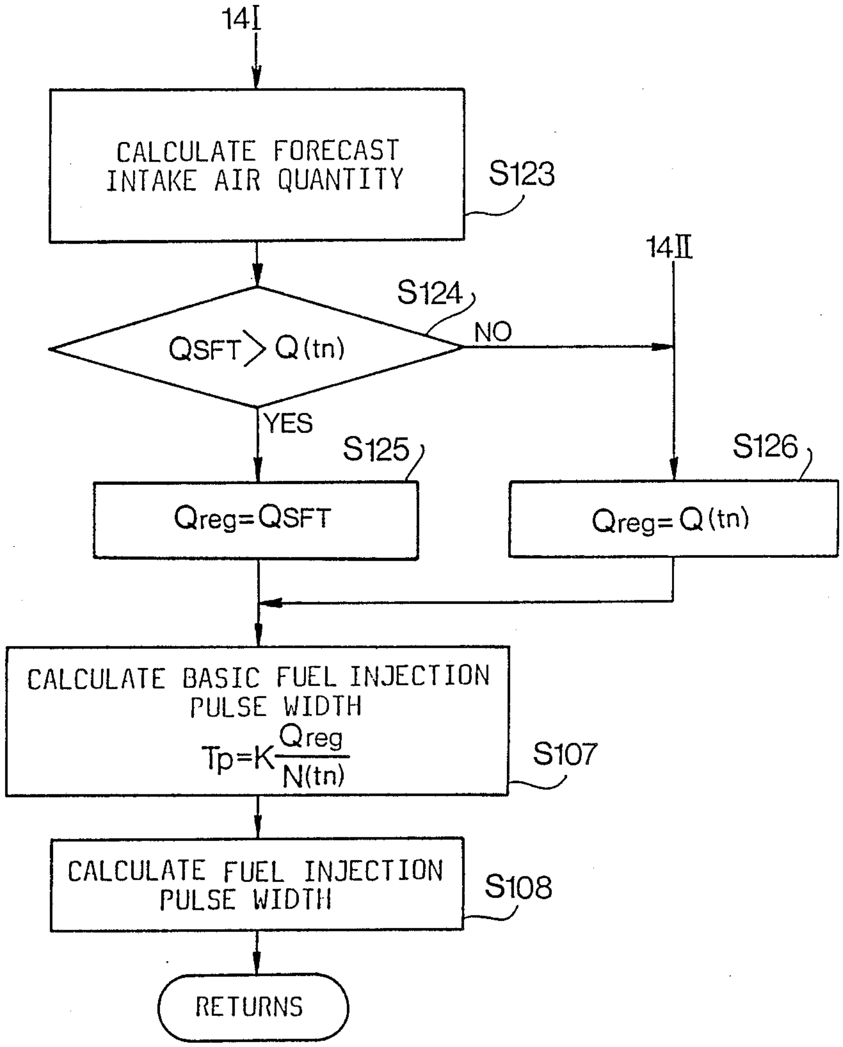

Referring to FIGS. 14*a* and 14*b* showing the operation of the fourth embodiment, at a step S121, the changing rate $\Delta\theta$tn is compared with a reference value DELTX. The reference value is derived from a table in accordance with the engine speed N. When acceleration or deceleration is detected, the program proceeds to a step S122 where the throttle position $\theta$Tn is compared with a reference limit value XLIM. It will be understood that when the throttle valve is rapidly opened from a widely opened position or closed from a small opening position, the intake air quantity does not largely change. In such a case it is not necessary to calculate the forecast intake air quantity. Accordingly, the program goes to a step S126 where the intake air quantity Q(tn) is selected.

When acceleration or deceleration is detected, the forecast intake air quantity QSFT is calculated at a step S123. At a step S124, when the quantity QSFT is larger than the quantity Q(tn), the quantity QSFT is regarded as the required quantity (S125).

Figure 15A:
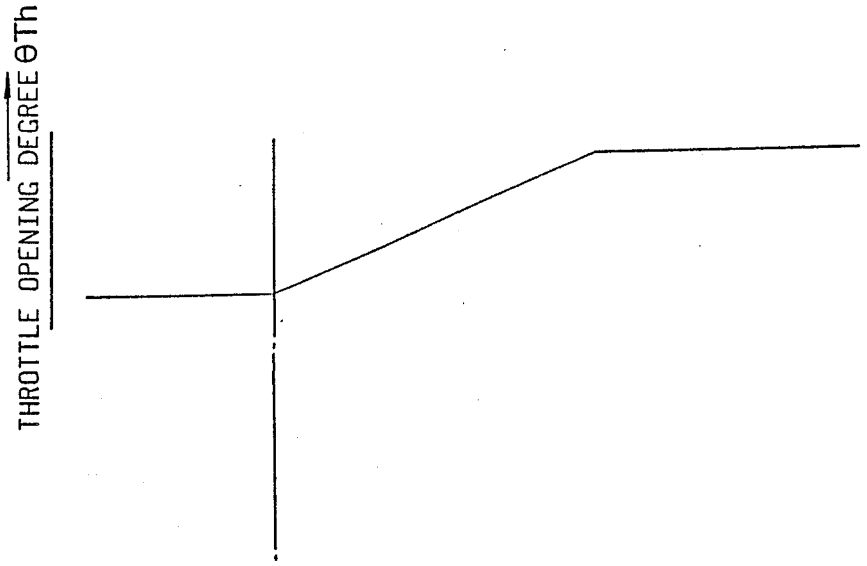
FIGS. 15*a* and 15*b* are graphs showing a variation of intake air quantity.
Figure 15B:
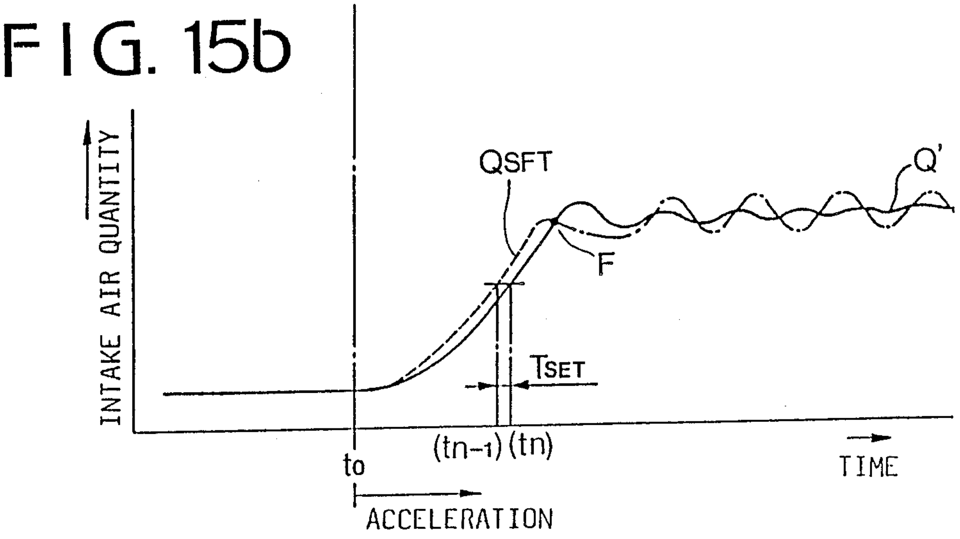
Figure 16A:
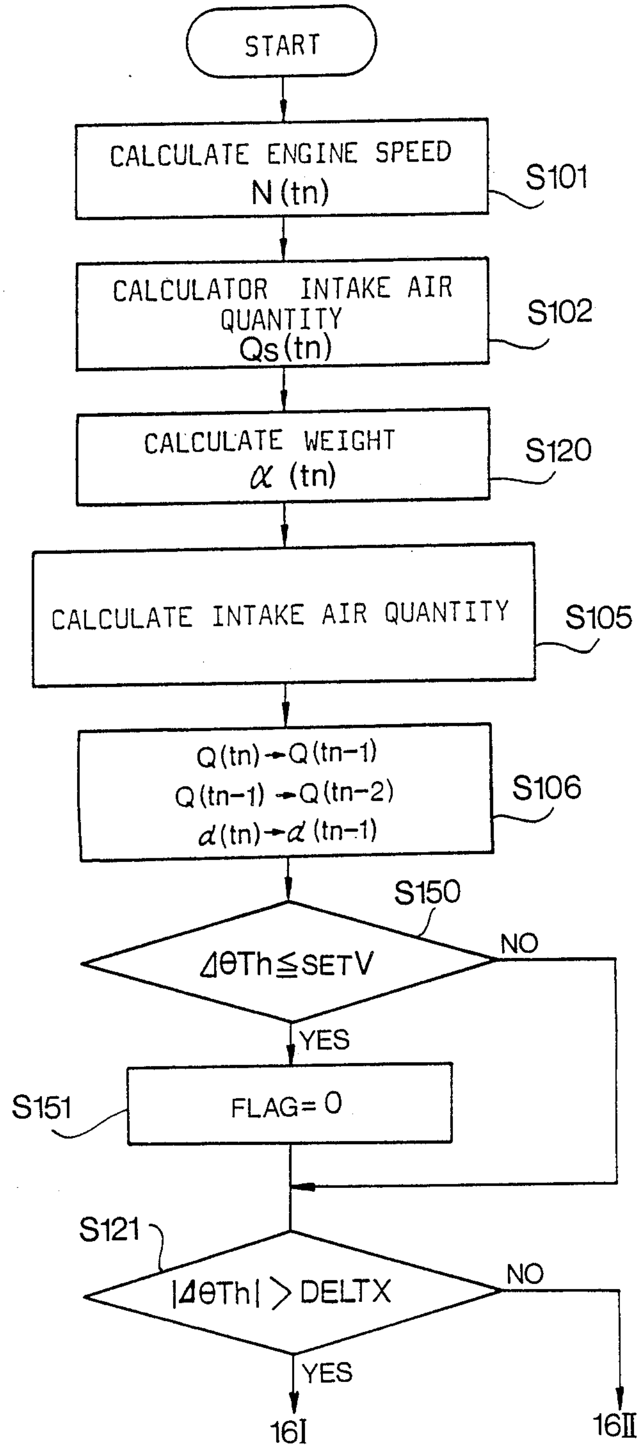
FIGS. 16*a* and 16*b* are flowcharts of the operation of a modification of the fourth embodiment.
Figure 16B:
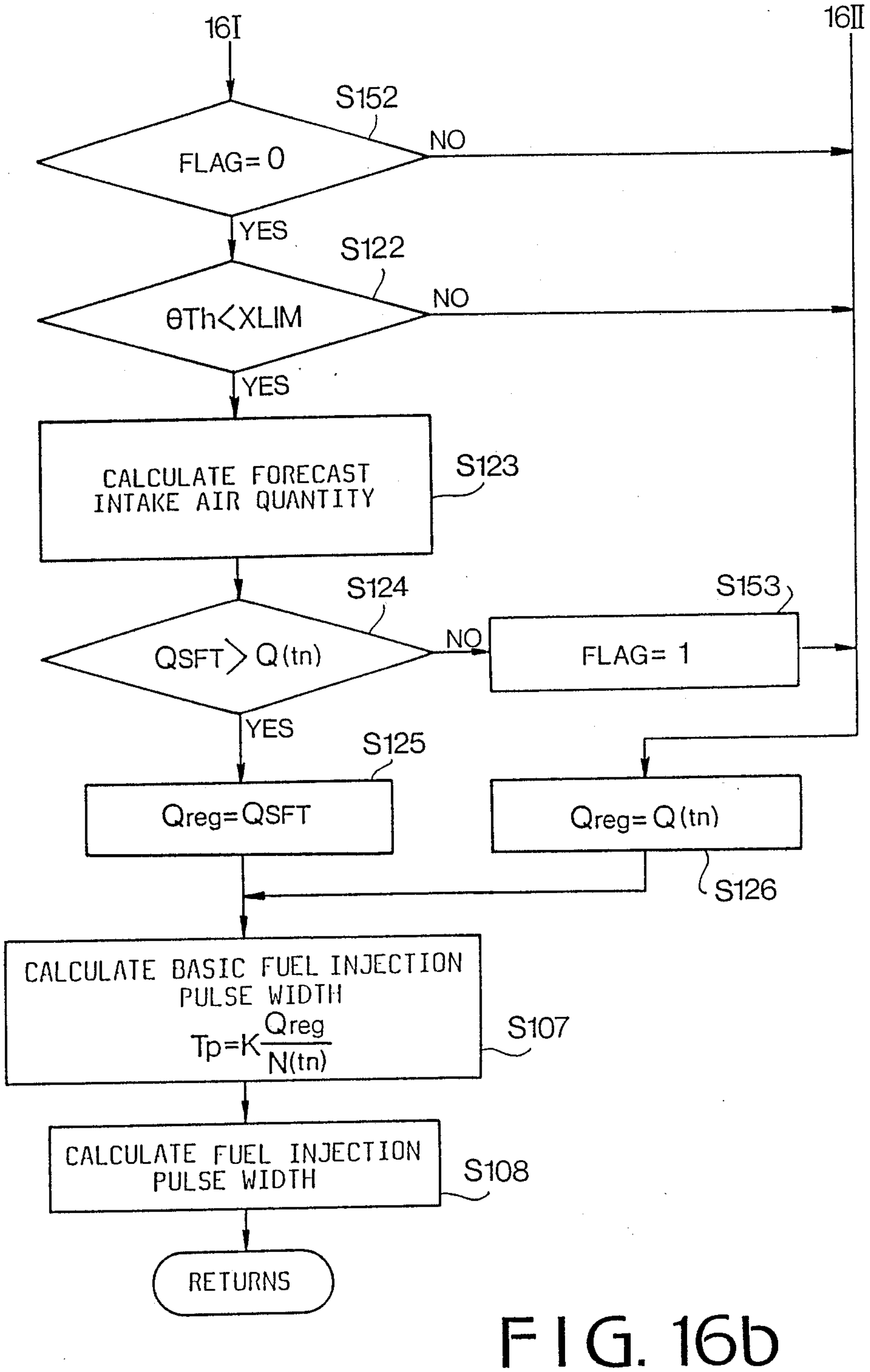

Referring to FIGS. 15*a* and 15*b*, the forecast intake air quantity QSFT increases with an increase of the actual intake air quantity Q′. After a point F where the quantity QSFT becomes lower than the quantity Q′, the quantity QSFT oscillates at larger amplitude than the quantity Q′, which causes errors of the intake air quantity Q(tn). Accordingly, the control dependent on the forecast air quantity QSFT must be stopped after the point F. The operation of FIGS. 16*a* and 16*b* is to meet such a requirement.

At a step S150, the throttle changing rate $\Delta\theta$Th is compared with a reference value SETV (for example 0). When the changing rate $\Delta\theta$Th is equal or smaller than the reference value SETV, which means that the opening degree $\theta$Th is constant, or the engine is decelerating, or the engine changes from a transient state to steady state, a flag is reset at a step 151 and the program proceeds to the step S121. When the changing rate $\Delta\theta$Th is smaller than the reference value DELTX, which means the engine is not accelerated, the program proceeds to the step S126 where the intake air quantity Q(tn) is selected.

When acceleration is determined at step S121, the program goes to a step S152 where it is determined if the flag is zero. When the flag has not been set, (flag is zero) the program goes to step S123 through the step S122. Namely, only when FLAG=0, $\Delta\theta$Th>DELTX (step S121) and $\theta$Th<XLIM, the program goes to step S123 where the forecast air quantity QSFT is calculated. When the forecast air quantity QSFT is smaller than the intake air quantity Q(tn) at the step S124, the program proceeds to a step S153 where a flag is set and the intake air quantity Q(tn) is selected at the step S126. Thus, the forecast air quantity QSFT is stopped.

In accordance with the present invention, intake air quantity corresponding to actually induced intake air quantity is accurately and quickly calculated without using a microcomputer having a large capacity at a low manufacturing cost.

Thus, the air fuel mixture is prevented from becoming rich or lean during a transient state, thereby improving the driveability of the motor vehicle, the efficiency of the engine and the exhaust emission.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for calculating intake air quantity in an automotive engine, having a fuel injector for injecting a predetermined amount of fuel into said engine, a throttle valve mounted on an intake passage of said engine for controlling air-fuel mixture, an engine speed sensor for detecting engine speed and for producing a corresponding engine speed signal, a throttle position sensor for detecting opening degree of said throttle valve and for producing a corresponding throttle opening degree signal, an intake air quantity sensor for detecting air quantity passing through said intake passage and for generating a corresponding quantity signal, and a control system for controlling said amount of fuel and ignition timing, the improvement in the system which comprises:

a throttle passing air calculator responsive to said quantity signal for calculating intake air quantity passing through said intake passage and for generating a corresponding intake air quantity signal;

weight deriving means responsive to said engine speed and said throttle opening degree signals for calculating a present weight corresponding to said engine speed and said opening degree at a present time and a last weight corresponding to said engine speed and said opening degree at a last time in order to correct said intake air quantity passing through said intake passage, and for producing corresponding present and last weight signals;

memory means responsive to said last and present weight signals for calculating a weight ratio derived from said last weight divided by said present weight and for storing said weight ratio;

calculator means responsive to said intake air quantity signal and said present and said last weight signals for calculating a present intake air quantity at a present time by adding a last intake air quantity multiplied by said last weight and said last intake air quantity multiplied by said weight ratio to said intake air quantity signal divided by said present weight and for producing a corresponding present intake air quantity signal;

storing means responsive to said present intake air quantity signal for storing said last and said present intake air quantities, said last and present weights and said weight ratio in order to calculate said present intake air quantity in said calculator means; and a fuel injection pulse calculator responsive to said present intake air quantity and said engine speed signals for deciding said ignition timing and said amount so as to inject an optimum amount of fuel at an optimum timing in accordance with transient operating conditions of said engine.

2. The system according to claim 1, further comprising transient detector means for detecting acceleration and deceleration dependent on the changing rate of the throttle position sensed by the throttle position sensor per unit time and for producing a transient signal, a forecast intake air quantity calculator responsive to the transient signal for calculating a forecast air quantity based on the calculated intake air quantity, and selector means responsive to the transient signal for selecting the forecast air quantity as said present intake air quantity.

3. A method for calculating intake air quantity to an engine, comprising the steps of:

detecting engine speed, an intake air quantity and opening degree of a throttle valve in an intake passage to the engine;

calculating an actual intake air quantity passing through the intake passage of the engine;

deriving a weight corresponding to said engine speed and said opening degree in order to correct said actual intake air quantity;

storing a present intake air quantity and a present weight at a present time, and a last intake quantity and a last weight at a last time;

estimating a present intake air quantity at said present time by adding an estimated air quantity to said last intake air quantity divided by said present weight; and controlling ignition timing and an amount of fuel so as to inject an optimum amount of fuel at an optimum timing in transient operating conditions of said engine.

4. The method according to claim 3, wherein said estimating step further comprises adding said last intake air quantity multiplied by a ratio of said last and present weights to said last intake air quantity divided by said present weight.

* * * * *